(12) United States Patent
Hamilton et al.

(10) Patent No.: US 8,184,287 B2
(45) Date of Patent: May 22, 2012

(54) MULTIPLE-LIGHT-PATH FRONT END FOR OES INSTRUMENT

(75) Inventors: Mark A. Hamilton, Upton, MA (US); John E. Goulter, Northridge, CA (US)

(73) Assignee: Thermo Niton Analyzers LLC, Billerica, MA (US)

( * ) Notice: Subject to any disclaimer, the term of this patent is extended or adjusted under 35 U.S.C. 154(b) by 337 days.

(21) Appl. No.: 12/547,317

(22) Filed: Aug. 25, 2009

(65) Prior Publication Data
US 2011/0051135 A1 Mar. 3, 2011

(51) Int. Cl.
*G01N 21/67* (2006.01)
*G01N 21/63* (2006.01)

(52) U.S. Cl. .......... 356/311; 356/313; 356/318
(58) Field of Classification Search .......... 356/311, 356/313, 316, 317, 318
See application file for complete search history.

(56) References Cited

U.S. PATENT DOCUMENTS

| | | | |
|---|---|---|---|
| 5,483,337 A * | 1/1996 | Barnard et al. | 356/316 |
| 6,259,757 B1 * | 7/2001 | Niemax et al. | 356/318 |
| 2008/0151241 A1* | 6/2008 | Lindfors et al. | 356/318 |

* cited by examiner

*Primary Examiner* — Layla Lauchman
(74) *Attorney, Agent, or Firm* — Gordon Stewart

(57) ABSTRACT

An optical emission spectroscopic system contains multiple distinct light paths that provide increased light to a spectrometer, thereby increasing sensitivity and signal-to-noise of the system.

21 Claims, 6 Drawing Sheets

Toward Spectrometer

MULTIPLE-LIGHT-PATH FRONT END FOR OES INSTRUMENT

TECHNICAL FIELD

The present invention relates to optical emission spectroscopic (OES) analyzers and, more particularly, to self-contained, hand-held OES analyzers.

BACKGROUND ART

Analyzing chemical composition of samples is important in many contexts, including identifying and segregating metal types (particularly various types of iron and steel) in outdoor metal recycling facilities, quality control testing in factories and forensic work. Several analytical methods are available.

Optical emission spectroscopy (OES) is a mature, robust technology for the elemental analysis of materials. In OES, a small quantity of sample material is vaporized and excited above atomic ground state. Emissions characteristic of elements in the vaporized sample are captured by a light guide, which sends the light to an analyzing unit, including a spectrometer, which produces and interprets a spectrum of light, so as to yield the elemental composition of the sample.

For metal samples, the prevalent techniques for generating emission spectra use either an electric arc or a spark, or both, to vaporize a small quantity of the sample to be analyzed. Alternatively, laser-induced breakdown spectroscopy (LIBS) or glow discharge (GD) may be used to vaporize and excite an emission sample. A survey of OES analytical techniques may be found in Slickers, Automatic Atomic-Emission Spectroscopy, Second Edition (1993), which is incorporated herein by reference.

One of the problems of available hand-held OES analyzers remains the small amount of light provided to the input of the built-in spectrometers, which inevitably limits signal-to-noise ratio and, therefore, the precision of spectral analysis of subject materials.

SUMMARY OF THE INVENTION

An embodiment of the present invention provides an increased-light-throughput analyzer for examining the composition of a sample. The analyzer includes a hand-held, self-contained, test instrument comprising an exciter for exciting at least a portion of the sample to generate optical radiation and an analyzing unit, which may include a spectrometer, performing analysis of the optical radiation. The increased light throughput of the system is a result of providing a multiplicity of optical channels transferring the optical radiation from the vicinity of exciter to the input of the spectrometer. Based on such increased light-throughput analysis, the material composition of the sample is determined with higher precision due to the increased amount of optical signal delivered to the spectrometer from the area of the excitation and increased signal-to-noise ratio. At the same time, the increased optical throughput of the device lowers the threshold of detection of material elements that are present in the sample in low concentrations and generate weak optical signals, thus increasing the overall sensitivity of the hand-held analyzer. An embodiment of the invention also includes detectors, detecting spectrally-resolved optical radiation and generating detection signals, and a processor in the test instrument, programmed to process the detection signals. A battery in the test instrument powers the exciter and the processor.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

As used in this description and the accompanying claims, the following terms shall have the meanings indicated, unless the context otherwise requires:

"Optical" refers to matter relating to or involving light, whether visible or invisible such as infrared (IR) or ultraviolet (UV).

To address some of the problems of available hand-held OES analyzers, including the small amount of light delivered to the input of the built-in spectrometers, low signal-to-noise ratio, and resulting low precision of spectral analysis of subject materials, an embodiment of the present invention provides an increased-light-throughput analyzer for examining the composition of a sample. The analyzer includes a hand-held, self-contained, test instrument comprising an exciter for exciting at least a portion of the sample to generate optical radiation and a spectrometer performing analysis of the optical radiation. The increased light throughput of the system is a result of providing a multiplicity of optical channels transferring the optical radiation from the vicinity of exciter to the spectrometer. Based on such increased-light-throughput analysis, the material composition of the sample may be determined with higher precision due to the increased amount of optical signal delivered to the spectrometer from the area of the excitation, and increased signal-to-noise ratio. At the same time, the increased optical throughput of the device lowers the threshold of detection of material elements that are present in the sample in low concentrations and generate weak optical signals, thus increasing the overall sensitivity of the hand-held analyzer. An embodiment of the invention also includes detectors, detecting spectrally resolved optical radiation and generating detection signals, and a processor in the test instrument, programmed to process the detection signals. A battery in the test instrument powers the exciter and the processor. The embodiments are discussed in the context of analytical techniques and test instruments that employ optical emission spectroscopy (OES); however, the teachings of this application are applicable to other types of analytical test instruments that employ spectral analysis, including test instruments that employ optical absorption spectroscopy. Furthermore, although the disclosed embodiments are discussed in the context of arc/spark excitation, other forms of excitation, including laser-induced breakdown (LIB) and glow discharge (GD), may be used.

Figure 1:
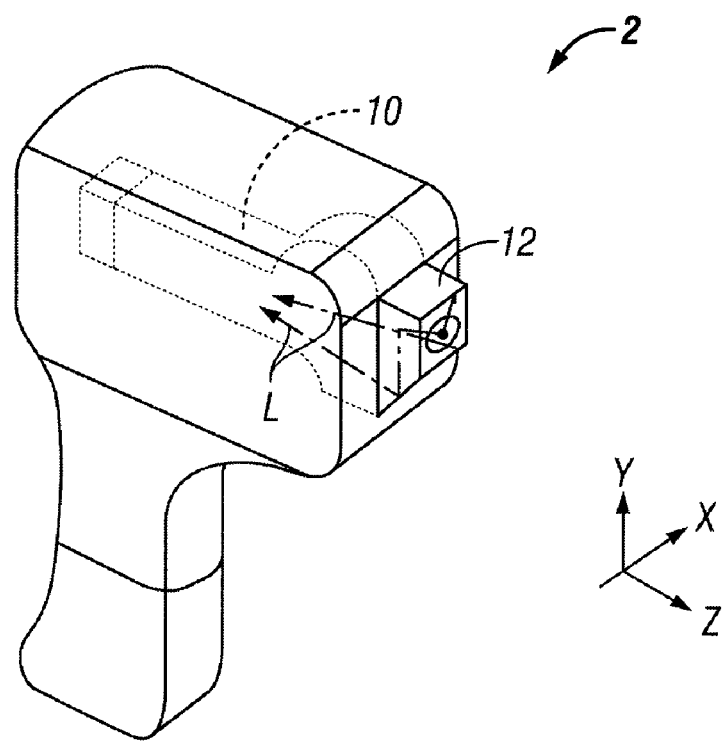
FIG. 1 is a perspective view of a self-contained OES test instrument according to an embodiment of the present invention.

Embodiments of the present invention are further described in reference to the following drawings, where similar elements are respectively marked with similar numbers and letters. FIG. 1 schematically illustrates a hand-held, self-contained, battery-powered OES test instrument 2, according to one embodiment of the present invention, with a built-in optical subsystem 10, shown in a dashed line. In operation, the optical radiation generated inside a nozzle element 12 is delivered through multiple optical channels, as indicated with arrows L, towards an analyzing unit that may contain a spectrometer (not shown), disposed within the optical sub-system 10. As discussed below, each of the multiple optical channels independently collects and delivers to the spectrometer a corresponding portion of the generated optical radiation, thus increasing the light-throughput of the instrument as compared to the prior art. Some other attributes of the instrument 2, such as a touchscreen, a trigger and operator interface buttons, for example, are not shown in FIG. 1 for clarity of illustration. Additional information about the structure and operation of a portable, hand-holdable, battery-powered OES instrument is available in U.S. patent application Ser. No. 12/036,039, titled "Hand-Held, Self-Contained Optical Emission Spectroscopy (OES) Analyzer," filed Feb. 22, 2008 by John E. Goulter, et al., the entire contents of which are hereby incorporated by reference herein for all purposes.

Figure 2:
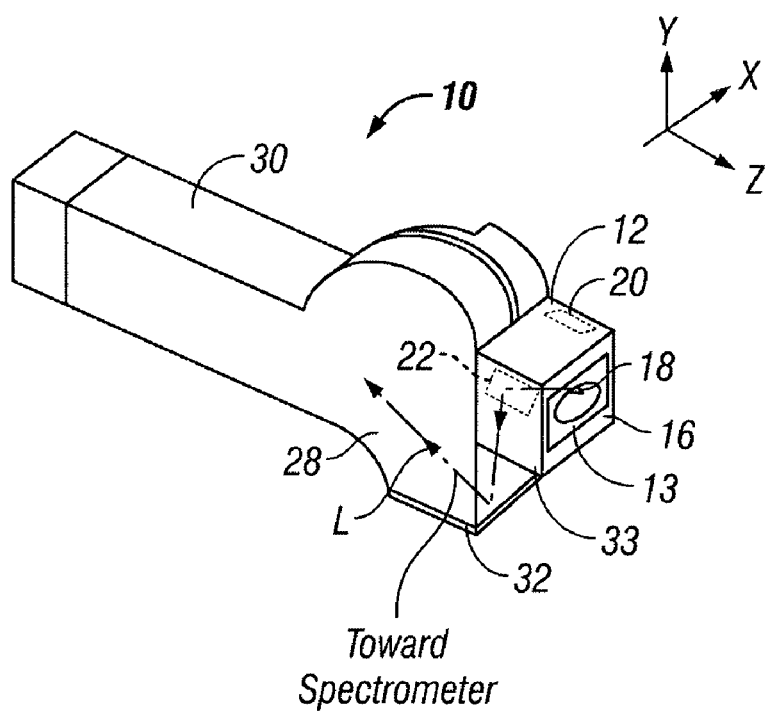
FIG. 2 is a perspective view of an optical subsystem of the test instrument of FIG. 1, according to one embodiment of the present invention.
Figure 3:
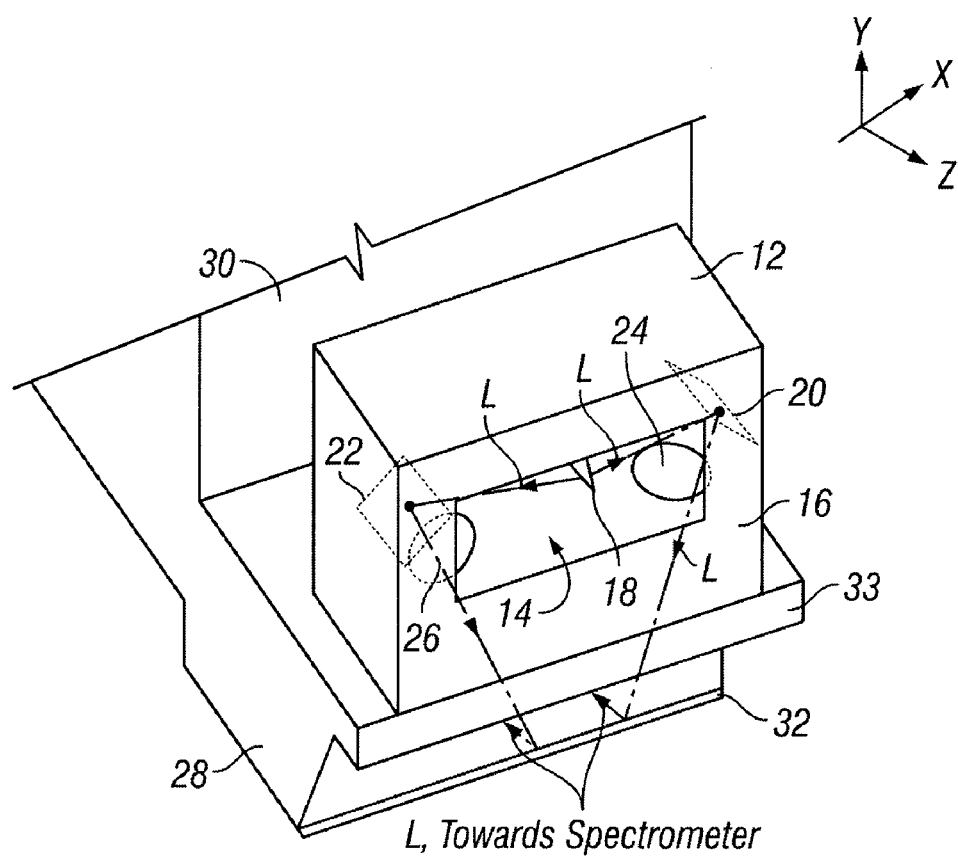
FIG. 3 is close-up perspective view of a front portion of the optical subsystem of FIG. 2.
Figure 9:
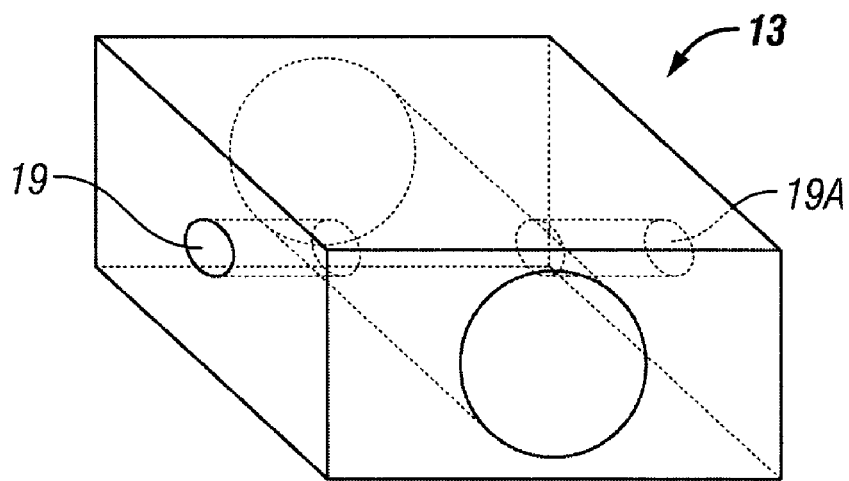
FIG. 9 is a perspective view of an insert for the nozzle element of FIG. 3, according to one embodiment of the present invention.

FIG. 2 is a perspective view of the optical sub-system 10 of the hand-held, self-contained, battery-powered OES test instrument 2 of FIG. 1 according to one embodiment of the present invention. The optical subsystem 10 includes the nozzle element 12 with an insert 13 fitting in an internal opening 14 (in FIG. 3). The front portion of the optical subsystem 10 is shown in FIG. 3 without the insert 13 inside the internal opening 14. Although the insert 13 is referred to as an "insert," the element 13 need not literally be inserted into the nozzle element 12 during manufacture. For example, the nozzle element 12 may be manufactured with the insert 13 as an integral part of the nozzle. The insert 13 is schematically illustrated in FIG. 9. Referring back to FIG. 2, in operation, an electrically-conductive flat portion 16 of the nozzle element 12 is pressed against an electrically-conductive sample surface (not shown). A spark from a counterelectrode 18, positioned within the internal opening 14, to the sample excites a portion of the sample, thereby generating optical radiation. The counterelectrode 18 is appropriately insulated from the electrically-conductive flat portion 16 of the nozzle element 12. In reference to FIGS. 1, 2, 3, 7 and 9, fractions L of the optical radiation propagate from the vicinity of counterelectrode 18 outwardly through the side channels 19 and 19A of the insert 13, are reflected by a plurality of collecting mirrors 20 and 22 (which are disposed inwardly adjacent to the internal opening 14 and shown in a dashed line) toward upper ports 24, 26, and further channeled by at least one upper bore (not visible in FIG. 3, 40 in FIG. 7A, 50 and 52 in FIG. 7B) through a lower portion 28 of a body 30 toward a composite reflector 32. The composite reflector 32 redirects the optical radiation toward the input of a spectrometer disposed within the optical subsystem 10.

The operation of the spectrometer is generally characterized by its spectral resolution, which describes the ability of the spectrometer to differentiate fine wavelength intervals. Spectral resolution is conventionally defined as a ratio of the smallest difference in wavelengths that can be distinguished at a certain wavelength (i.e., as the spectral separation between the two closest spectral peaks that the spectrometer can resolve). As is well known in the art, to achieve maximum spectral resolution defined by the optical system of the spectrometer, optical radiation should be delivered to the entrance slit of the spectrometer within a pre-determined spatial acceptance angle and coaxially with the optical axis of the spectrometer. If the entering optical radiation comprises several portions, e.g., is composed of several beams, it is preferred that beams substantially coincide, i.e., substantially overlap, in space to optimize the spectral resolution of the instrument.

At least one optical dispersive element, such as a diffractive grating, within the spectrometer spatially disperses the incoming optical radiation and relays it towards target optical elements, such as a set of detectors (not visible in FIG. 1). The set of detectors is further coupled to a processor (not visible) that is programmed to process signals from the detectors. The processor analyzes at least a portion of the spectrum produced by the spectrometer to identify and quantify the elemental composition of the sample, and appropriately transmits the results to a communication device, such as a computer or display, which may be external or built-in. A detachable, rechargeable battery (not visible) powers the processor, the spectrometer, a spark generator (not visible) that is coupled to the counterelectrode 18, and possibly the communication device.

In the optical subsystem 10, shown in FIGS. 1, 2 and 3, the nozzle element 12 is detachable from the body 30 and is disposed on a platform support 33. It is understood, however, that in other embodiments of the invention the nozzle element 12 may be permanently affixed to the body 30.

Figure 4:
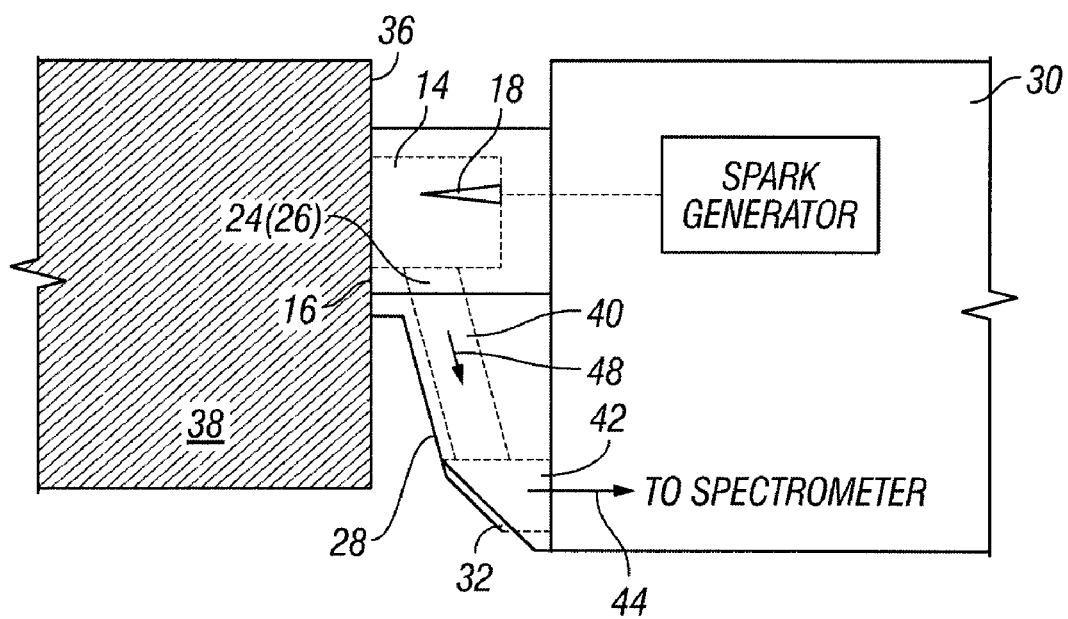
FIG. 4 shows a nozzle element of the test instrument of FIG. 1 in contact with a sample surface.

FIG. 4 schematically illustrates a front portion of the test instrument with the nozzle element 12 in contact with a surface 36 of a sample 38. As shown in FIG. 4, a sharpened tip portion of the counterelectrode 18 is disposed about 2-3 mm from the sample surface 36, thereby creating an analytical gap. The counterelectrode 18 may be about $1/16$-$1/4$ inch in diameter and is preferably made of thoriated tungsten, although other suitable materials such as carbon (graphite) or silver may be used. The counterelectrode 18 is generally made of a material that produces a simple spectrum if excited, or at least a spectrum that is easily distinguished from spectra produced by likely materials in the sample 38. In operation, the internal opening 14 of the nozzle element 12 may be appropriately purged with inert gas using an auxiliary structure within the instrument to remove air that would otherwise absorb some light generated in the analytical gap due to excitation of the sample, as described below. Methods and apparatus for providing a gas to a hand-held test instrument, including from a gas tank coupled directly to, and possibly enclosed within a portion of, the instrument, are disclosed in detail in the commonly assigned U.S. Patent Application Publication No. 2008/0192897A1 titled "Small Spot X-Ray Fluorescence (XRF) Analyzer," the contents of which are hereby incorporated by reference.

In operation, an electrical potential between the counterelectrode 18 and the sample surface 36 breaks down the gas in the analytical gap, and enables an electrical current, in the form of a spark or an arc or both, to flow from the counterelectrode 18 to the sample surface 36. The spark heats the gas and vaporizes a small amount of the sample. The vaporized sample material is further excited along with the hot gas and produces an optical discharge, at least a portion of which is collected by the collecting mirrors (20 and 22 in FIG. 2) through thin windows (not shown) that are sufficiently transparent at the wavelengths of the optical signal. The counterelectrode 18 is preferably provided with positive unidirectional current to prevent erosion of the counterelectrode 18.

Figure 5:
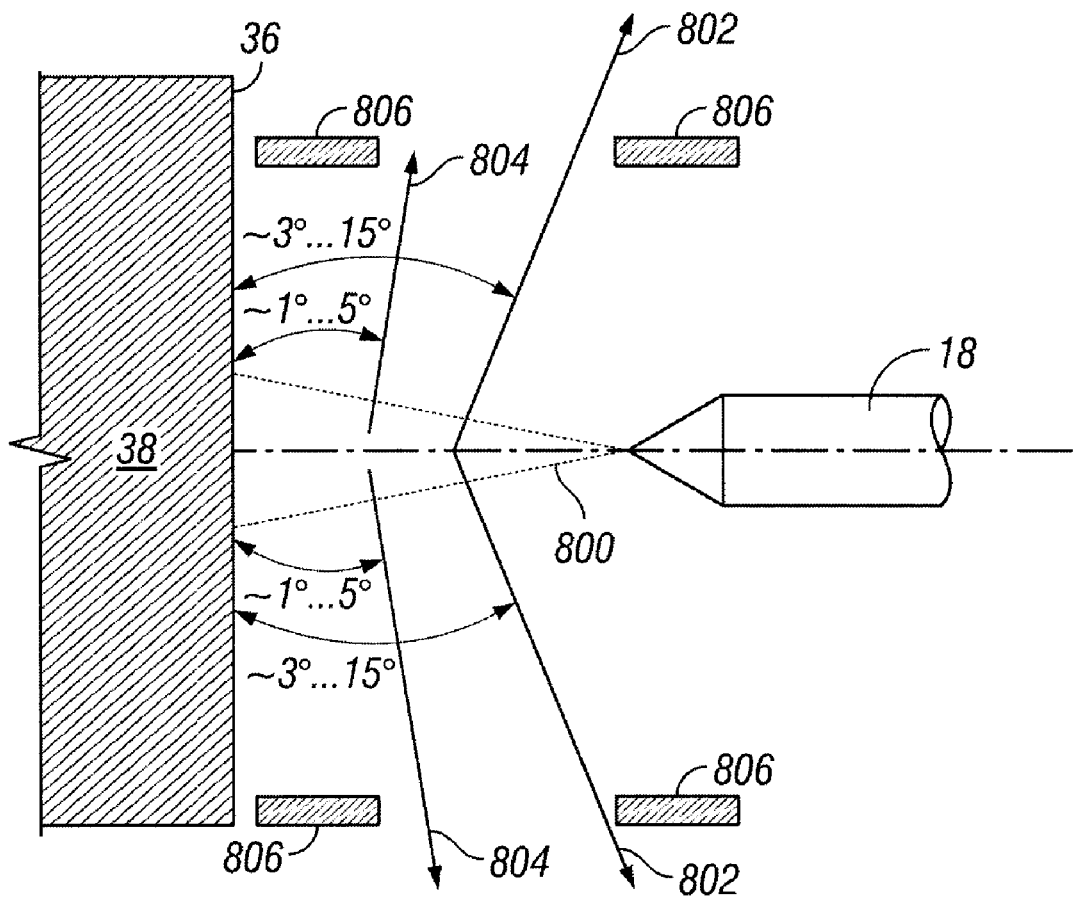
FIG. 5 is a close-up schematic view of an analytical gap produced by the test instrument of FIG. 1.

FIG. 5 is a close-up top view of the analytical gap, showing a discharge region 800 between the counterelectrode 18 and the sample surface 36. In a typical discharge, the portion of the region 800 closer to the sample surface 36 is hotter (at about 30,000° C.) than the portion of the region 800 (at about 1,500° C.) closer to the counterelectrode 18. Thus, shorter wavelength line emissions 804 from the sample constituents such as phosphor, sulfur and carbon emanate from the hotter portion of the region 800. Conversely, soft line emissions 802 from the elements such as aluminum and copper emanate from the cooler portion of the region 800. Emissions from an analyte, excited by the discharge, should be sampled from a volume of the analytical gap where the analyte is ionized. Generally, an angle of about 3° provides a good practical viewing angle, enabling observation of both the soft line emissions 802 (visible at about 3° to 15°) and the hard line emissions 804 (observed at about 1°-5°), although observation at other angles may be found practical. A mask 806 may be used to avoid observing emissions from the hot tip of the counterelectrode 18 or emissions from the sample surface 36, which provide strong off-set noise signal.

To enable the required observation and to optimize the delivery of optical radiation to the spectrometer, in an embodiment of the current invention, a plurality of collecting mirrors (shown as 20, 22 in FIG. 3) is correspondingly complemented with multiple optical paths optically connecting the source of optical radiation, resulting from the sample excitation, with the spectrometer through the nozzle element 12 and the lower portion 28 of the body 30.

Referring, once again, to FIG. 3, the features of the nozzle element 12 and the lower portion 28 of the body 30 that are hidden in the figure are shown by dashed lines. These hidden features include an internal opening 14 and multiple optical paths, each comprising one corresponding upper port (24 or 26 in FIG. 3) in the nozzle element 12, an appropriately confined passage through the body 30, and the composite reflector 32. (As will be discussed below, a composite reflector 32 may comprise several fragments, but each optical path includes a fragment of the composite reflector 32.) The confined passage may comprise tubular sections that generally have any cross-sectional shape, not necessarily circular. For example, in reference to FIG. 4, the confined passage may include an upper bore 40, optically connecting the corresponding upper port with the composite reflector 32, and a lower gouge 42, optically connecting the composite reflector 32 with the spectrometer. The composite reflector 32 is disposed in the lower portion 28 of the body 30 so that it inwardly reflects the optical radiation, delivered to it from the collecting mirrors 20, 22 of FIG. 3 through the upper ports 24, 26 and the upper bore 40, as indicated by the arrow 44 (FIG. 4), toward the spectrometer disposed within the body 30 of the optical subsystem 10.

Figure 6:
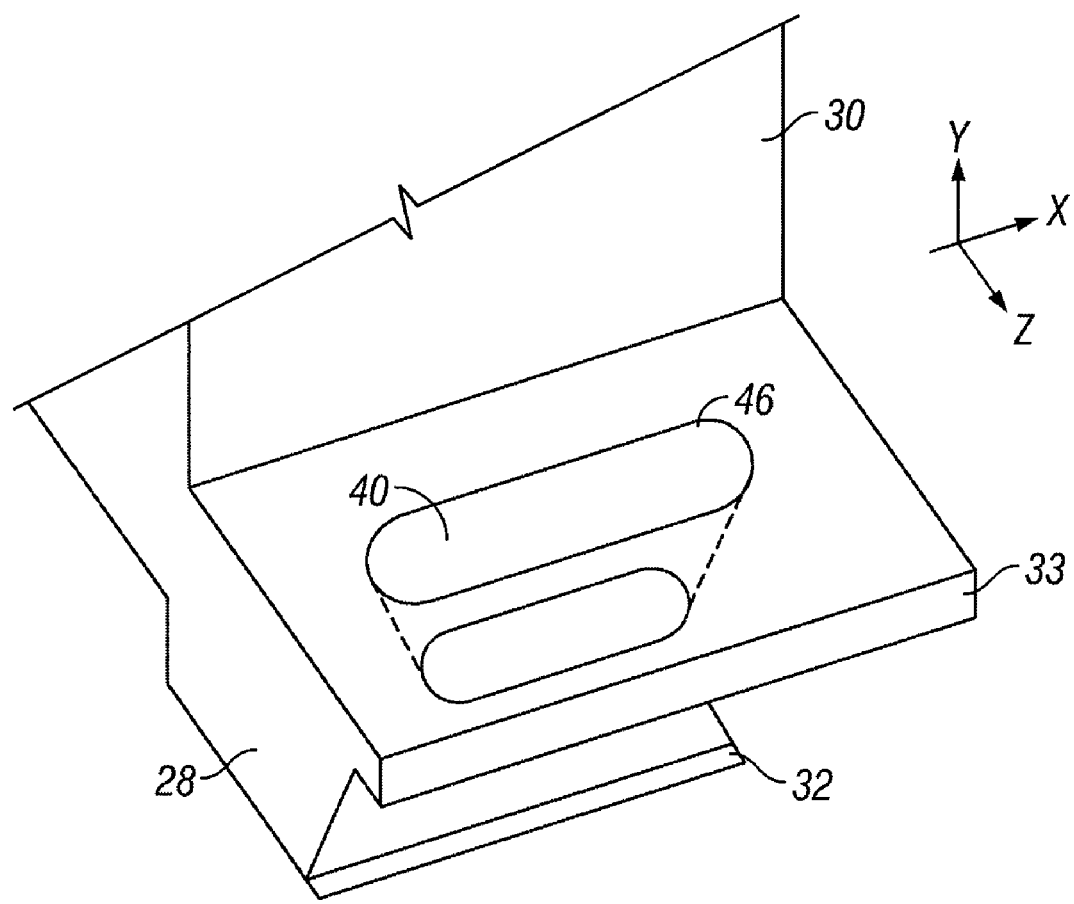
FIG. 6 is a close-up perspective view of a front portion of the optical subsystem of FIG. 1 with the nozzle element removed.
Figure 7A:
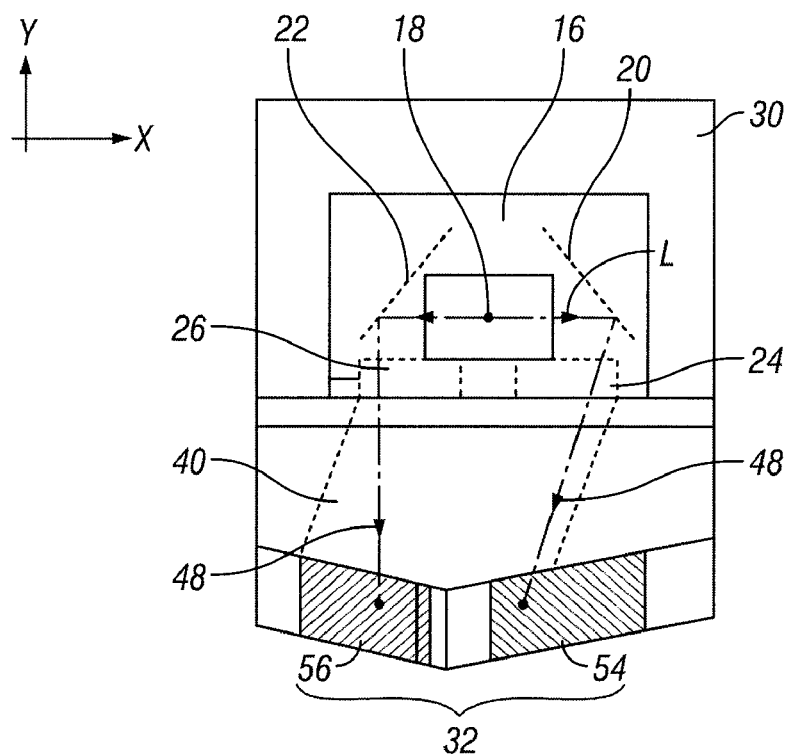
FIG. 7A is a front view of an embodiment of the optical subsystem of FIG. 2 comprising a single bore.

FIG. 6 schematically illustrates the front portion of the optical subsystem of FIG. 3 with the nozzle element 12 removed. As shown, the upper bore 40 is formed in a recess 46 of the lower portion 28 of the body 30 to guide optical radiation (gathered by the collecting mirrors 20, 22 and delivered to the upper bore 40 through the upper ports 24, 26 of the nozzle element 12 of FIG. 3), as shown with an arrow 48, toward the composite reflector 32 (FIG. 4). Generally, the upper bore 40 comprises at least one segment between the upper ports 24, 26 and the composite reflector 32, as shown in FIG. 7A. It would be readily understood, however, that in different embodiments of the invention the number of upper bores, optically connecting the plurality of collecting mirrors (20 and 22 in FIGS. 3 and 7A) with the composite reflector 32, as well as the number of segments in each upper bore, may be different. For example, an embodiment of the instrument of the invention may comprise a multiplicity of upper bores, each arranged to deliver optical radiation from a corresponding mirror from the plurality of collecting mirrors 20, 22 and consist of two or more segments, as may be dictated by the overall geometry of the instrument. As will be understood by a person skilled in the art, in a case where a given upper bore comprises more than one segment, an additional reflective or refractive element (not shown) may be appropriately disposed in between the segments to redirect optical radiation toward the composite reflector 32. An exemplary schematic of an embodiment of the invention with two single-segment bores 50 and 52, connecting the collecting mirrors 20, 22 and the composite reflector 32, is provided in a front view in FIG. 7B. The bores can be created by machining the material of the nozzle element 12 and the lower portion 28 of the body, casting or other suitable manufacturing techniques.

The plurality of collecting mirrors in an embodiment of the invention may include two or more mirrors adequately disposed adjacent to the internal opening 14 of the nozzle element 12 to boost the amount of optical radiation delivered to the spectrometer for the analysis of the sample composition through the spatially distinct optical channels, which are substantially defined by the upper ports, the upper bore(s) in the lower portion 28 of the body 30, the composite reflector 32, and the lower gouge 42 of FIG. 4. (Each of the distinct optical channels, therefore, extends from the corresponding collecting mirror to the input of the spectrometer.) As a result of such increase in light signal input to the spectrometer, the material composition of the sample may be determined with higher precision. At the same time, the increased optical throughput of the test instrument lowers the threshold (and, therefore, increases the sensitivity) of detection of material elements that are present in the sample in low quantities and generate weak optical signals, thus increasing the overall sensitivity of the hand-held analyzer.

Any increase in number and discretionary distribution of the collecting mirrors adjacent to the internal opening 14 may allow for an increase of collected and delivered optical signal to the detectors of the spectrometer. However, multiple collecting mirrors may be paired on opposing sides of the source of optical radiation, in a reflectionally-symmetric fashion with respect to a vertical plane containing a primary axis of the counterelectrode 18 (i.e., a plane coplanar with the yz-plane in FIGS. 1-3 and 6) to simplify the design of the spatially distinct optical channels for light delivery to the spectrometer. In addition, as may be dictated by geometry of some embodiments of the instrument, the two collecting reflectors may be diametrically opposed to one another. For example, the collecting mirrors 20, 22 are shown as planar mirrors disposed at substantially (but not necessarily equal) 45-degree angles with respect to the yz-plane, which collect the optical radiation from two opposing sides of the discharge glow in the analytical gap at substantially right angles with respect to the yz-plane and reflect the collected radiation downward through the upper bore 40 of FIG. 7A (or upper bores 50, 52 of FIG. 7B).

Alternatively, the collecting mirrors may be curved, in which case they may aggregate a larger amount of radiation within the numerical aperture of the mirrors and provide additional focusing of the optical radiation if required to appropriately image the viewable portions of the discharge region 800 of FIG. 5 onto the entrance slit of the spectrometer. To prevent optical channels from being accidentally exposed to the discharge spark and/or debris from the analytical gap, each of the collecting mirrors may be protected with a thin window (shown in FIG. 8 at 58 and 60, not shown in FIGS. 1 through 7).

In some embodiments, where appropriately chosen gas is plumbed to the vicinity of the counterelectrode 18 to purge the internal opening 14 of air, at least in part because the air may alter the spectral distribution of the optical signal, such thin windows 58, 60 may additionally provide a gas-tight seal between the internal opening 14 and the upper bore(s), of FIG. 7, of an embodiment. Such a gas-tight seal may be used to reduce the leakage of purging gas through the optical channels of the embodiment. The windows 58, 60 are preferably made of beta alumina ($\beta$-$Al_2O_3$ or "synthetic sapphire") or another material that is sufficiently transparent at the wavelengths of the optical signal. Although, as shown in FIG. 8, the protecting windows 58, 60 are disposed along the inner walls of the electrically-conductive flat portion 16 of the nozzle element 12 of FIG. 3, any suitable alternative placement is contemplated by the embodiments of the invention. For example, the windows may be disposed at the outer openings of the side channels 19 and 19A of the of the insert 13 of FIG. 9, that is placed into the internal opening 14 of the nozzle element 12 to provide thermal insulation and mechanical protection of the nozzle element 12. The insert 13 may be metallic or ceramic, or may be fabricated from other suitable material.

As was mentioned above, in some embodiments, an upper bore (such as the upper bore 40 of FIGS. 4, 6, 7A) may comprise multiple sequential segments. In these embodiments additional optical elements, such as supplementary reflectors, may be disposed at the intersections between the consecutive segments of the upper bore for proper optical connection between the collecting mirrors and the composite reflector 32.

The composite reflector 32 may comprise a planar fused silica substrate, aluminized and further protected with a magnesium fluoride coating, or appropriately overcoated with a thin-film stack of other optical materials as suitable for operation within the spectral region of the optical radiation generated by the spark between the counterelectrode 18 and the surface 36 of the sample 38. Alternatively, a composite mirror may be curved to provide for collecting a large portion and better focusing of the optical radiation on the entrance slit of the spectrometer.

Generally, the configuration and structure of the composite reflector 32 is dictated by the arrangement of the optical subsystem 10 and, in particular, the location of the entrance slit in the spectrometer and the orientation of the spectrometer within the optical subsystem. For example, the orientation of the optics of the spectrometer, which may be asymmetrically disposed within the body of the portion 10, may require the composite reflector 32 to be irregularly structured to most efficiently redirect optical flux from the collecting mirrors 20, 22 toward the entrance slit of the spectrometer. In such an embodiment, the composite reflector 32 may consist of two (planar or appropriately curved) mirror components 54 and 56, generally disposed in different planes. FIG. 7A demonstrates such an embodiment in the schematic front view of the optical subsystem 10, wherein planar components 54, 56 are asymmetrically (and optionally detachably) connected to the lower portion 28 of the body 30 to internally reflect light into the lower gouge 42.

Figure 7B:
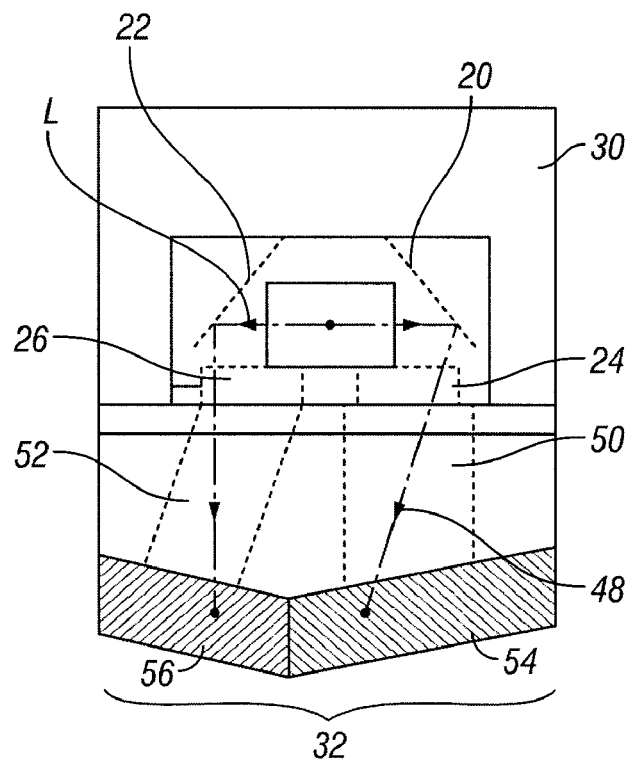
FIG. 7B is a front view of the alternative embodiment of the optical subsystem of FIG. 2 comprising two bores.
Figure 8:
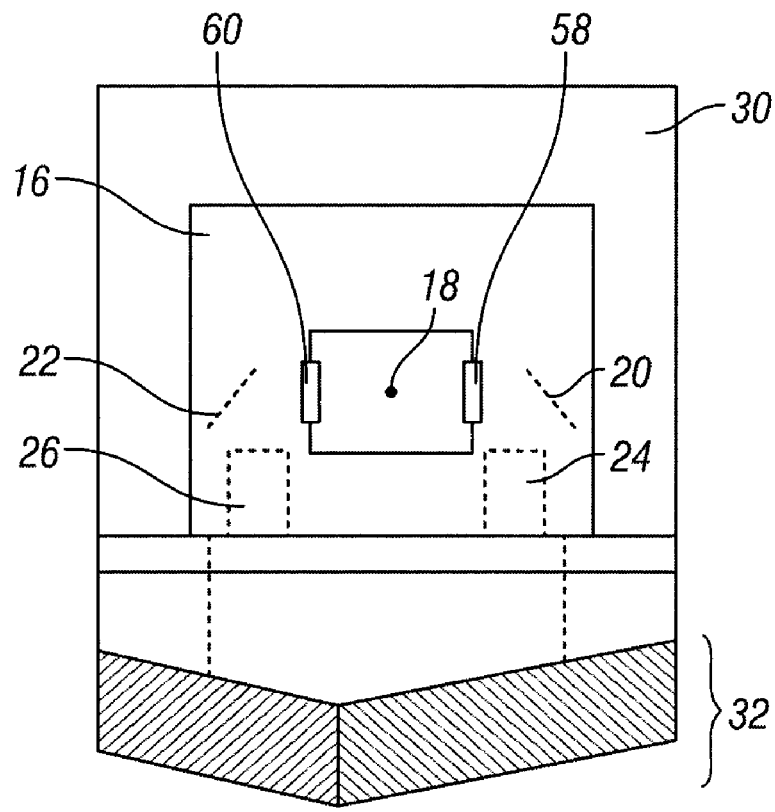
FIG. 8 is a front view of the optical subsystem of FIG. 2.

In another embodiment, shown in FIG. 7B the planar components 54, 56 may be adjoined thus forming an obtuse-angle reflective roof. In either embodiment, the mirror components 54, 56 respectively forward the two portions of optical flux from the two corresponding collecting mirrors 20, 22 through the lower gouge 42 in the direction of the spectrometer (as indicated with an arrow 44 in FIG. 4). As will be understood by the person skilled in the art, the azimuthal and latitudinal inclinations of the composite reflector components 54, 56 (i.e., inclinations in the xz-plane and in a plane perpendicular to the xz-plane, respectively) generally depend on mutual orientation of the collecting mirrors with respect to the optics of the spectrometer. These inclinations are appropriately chosen to substantially recombine the two portions of the optical flux incident on the composite reflector to deliver the radiation flux to the entrance slit of the spectrometer within its spatial angle of acceptance that is judiciously chosen to warrant that a target spectral resolution of the spectrometer of the test instrument is not impaired.

As discussed above, the upper ports, the confined passage(s) comprising the upper bore(s) and the lower gouge, and the composite reflector provide the plurality of optical paths used to increased the amount of optical radiation provided for the spectral analysis of the sample as compared to the a prior art. It is understood that, although the optical paths generally originate in separate spatial locations corresponding to the separate upper ports (24 and 26 in FIGS. 3, 4, 7), in other embodiments they may co-originate if only a single upper port is provided within the nozzle element of the test instrument.

Some embodiments may require use of a suitable image rotator in one or more of the optical paths, allowing full-extent imaging of the unobstructed portion of the extended discharge region 800 of FIG. 5 onto the entrance slit of the spectrometer of the test instrument. Such a situation may arise, for example, where the collecting mirrors (22 and 20 in FIGS. 2 and 7) are not disposed in a reflectionally-symmetric manner with respect to the yz-plane. In these situations, an image rotator rotates an image of the source of optical radiation, formed on the entrance slit of the spectrometer, to compensate for the angular deviation between the direction corresponding to the orientation of the source of optical radiation being imaged and that corresponding to the orientation of the slit of the spectrometer. The amount of the required rotation may generally range from 0° to 90°. As would be understood by a person skilled in the art, an appropriate image rotator generally includes at least three surfaces that reflect the delivered optical radiation to achieve the desired result. However, any other suitable image rotator may be used.

The described embodiments are to be considered in all respects only as illustrative and not restrictive. It is recognized that departures can be made therefrom within the scope of the invention, which is therefore not to be limited to the details disclosed herein, but is to be accorded the full scope of the claims so as to embrace any and all equivalent apparatus and methods.

What is claimed is:

1. An analyzer for analyzing composition of a sample, comprising:
    a hand-held, self-contained test instrument that includes:
        an exciter for exciting at least a portion of the sample to produce an optical signal;
        a first optical channel for delivery of a first portion of the optical signal from the exciter to an optical element, the optical element characterized by an input direction, the optical element creating a dispersed signal that contains spectral information about the sample;

a second optical channel for delivery of a second portion of the optical signal from the exciter to the optical element, the second optical channel being spatially distinct from the first optical channel; and a battery powering the exciter wherein the test instrument further includes first and second collecting mirrors for respectively redirecting the first and the second portions of the optical signal towards the first and the second optical channels.

2. An analyzer for analyzing composition of a sample, comprising:

a hand-held, self-contained test instrument that includes:

an exciter for exciting at least a portion of the sample to produce an optical signal;

a first optical channel for delivery of a first portion of the optical signal from the exciter to an optical element, the optical element characterized by an input direction, the optical element creating a dispersed signal that contains spectral information about the sample;

a second optical channel for delivery of a second portion of the optical signal from the exciter to the optical element, the second optical channel being spatially distinct from the first optical channel; and a battery powering the exciter;

wherein at least one of the at least two optical channels includes an image rotator.

3. An analyzer for analyzing composition of a sample, comprising:

a hand-held, self-contained test instrument that includes:

an exciter for exciting at least a portion of the sample to produce an optical signal;

a first optical channel for delivery of a first portion of the optical signal from the exciter to an optical element, the optical element characterized by an input direction, the optical element creating a dispersed signal that contains spectral information about the sample;

a second optical channel for delivery of a second portion of the optical signal from the exciter to the optical element, the second optical channel being spatially distinct from the first optical channel; and a battery powering the exciter;

wherein the test instrument further includes a nozzle element and the first and the second optical channel each comprises a respective confined passage defined through the nozzle element of the test instrument.

4. An analyzer in accordance with claim 3, wherein the delivery of the first and the second portions of the optical signal to the optical element is provided substantially within a spatial angle of acceptance determined on the basis of a required spectral resolution of a spectrometer.

5. An analyzer in accordance with claim 4, wherein the test instrument further includes the spectrometer in the test instrument.

6. An analyzer in accordance with claim 5, wherein the optical element receives the first and the second portions of the optical signal substantially coincidentally.

7. An analyzer in accordance with claim 1, wherein at least one of the first and the second collecting mirrors is separated from the exciter by a window substantially transparent at the wavelengths of the optical signal.

8. An analyzer in accordance with claim 7, wherein the test instrument further includes an auxiliary structure for delivering inert gas to the nozzle element of the test instrument.

9. An analyzer in accordance with claim 1, wherein the optical element is disposed within a spectrometer having a range extending at least from about 175 nm to about 400 nm, the spectrometer characterized by an input optical axis, the spectrometer disposed in the test instrument to receive at least a portion of the optical signal and operative to disperse the at least a portion of the optical signal and produce an output signal from the dispersed at least a portion of the optical signal.

10. An analyzer in accordance with claim 1, wherein the test instrument further includes at least two collecting mirrors for collecting at least a portion of the optical signal and redirecting the at least a portion of the optical signal to the first and the second optical channels.

11. A method of analyzing composition of a sample with a hand-held, self-contained test instrument, the method comprising:

exciting at least a portion of the sample with an exciter to produce a source of optical radiation;

distributing at least a portion of optical radiation from the source of optical radiation through a plurality of spatially distinct optical channels formed within the test instrument to provide optical communication between the source of optical radiation and an analyzing unit, the analyzing unit characterized by a spatial angle of acceptance and an input direction; and using the analyzing unit to interpret a spectrum of the at least a portion of the optical radiation, delivered to the analyzing unit substantially along the input direction, to yield elemental composition of the sample;

wherein distributing the at least a portion of the optical radiation comprises collecting the at least a portion of the optical radiation with a plurality of collecting mirrors that redirect the at least a portion of the optical radiation through the respective ones of the confined passages.

12. A method according to claim 11, wherein distributing the at least a portion of the optical radiation through the plurality of spatially distinct optical channels further comprises passing the at least a portion of the optical radiation through confined passages, each confined passage respectively corresponding to at least one of the spatially distinct optical channels.

13. A method according to claim 11, wherein distributing the at least a portion of the optical radiation through the plurality of spatially distinct optical channels further comprises recombining optical radiation that has passed through the confined passages substantially within the spatial angle of acceptance.

14. A method according to claim 11, wherein distributing the at least a portion of the optical radiation through the plurality of spatially distinct optical channels comprises collecting the at least a portion of the optical radiation from opposing sides of the source of optical radiation.

15. A method according to claim 11, wherein the plurality of collecting mirrors includes at least one curved mirror.

16. An analyzer in accordance with claim 1 additionally comprising a mask to avoid the analyzer observing emissions from a surface of the sample.

17. An analyzer in accordance with claim 1 wherein the exciter comprises a counterelectrode, the analyzer additionally comprising a mask to avoid the analyzer observing emissions from a tip of the counterelectrode.

18. An analyzer in accordance with claim 3 additionally comprising a mask to avoid the analyzer observing emissions from a surface of the sample.

19. An analyzer in accordance with claim 3 wherein the exciter comprises a counterelectrode, the analyzer additionally comprising a mask to avoid the analyzer observing emissions from a tip of the counterelectrode.

20. A method according to claim 11 wherein a mask avoids the instrument observing emissions from a surface of the sample.

21. A method according to claim 11 wherein at least a portion of the sample is excited with an exciter comprising a counterelectrode, and wherein a mask avoids the instrument observing emissions from a tip of the counterelectrode.

* * * * *